(12) United States Patent
Naden et al.

(10) Patent No.: US 9,225,383 B2
(45) Date of Patent: Dec. 29, 2015

(54) SYSTEM AND METHOD FOR IMPLEMENTATION OF A DIRECT SEQUENCE SPREAD SPECTRUM TRANSMITTER

(75) Inventors: Gary Naden, Bozeman, MT (US); Dale Reiser, Meridian, ID (US)

(73) Assignee: GEOFORCE, INC., Irving, TX (US)

( * ) Notice: Subject to any disclaimer, the term of this patent is extended or adjusted under 35 U.S.C. 154(b) by 927 days.

(21) Appl. No.: 13/420,404

(22) Filed: Mar. 14, 2012

(65) Prior Publication Data
US 2013/0241775 A1    Sep. 19, 2013

(51) Int. Cl.
| | | |
|---|---|---|
| H04B 1/00 | (2006.01) |
| H04B 1/707 | (2011.01) |
| G01S 1/08 | (2006.01) |
| G01S 5/00 | (2006.01) |
| G01S 19/14 | (2010.01) |
| G01S 19/35 | (2010.01) |

(52) U.S. Cl.
CPC . *H04B 1/707* (2013.01); *G01S 1/08* (2013.01); *G01S 5/0027* (2013.01); *G01S 19/14* (2013.01); *G01S 19/35* (2013.01)

(58) Field of Classification Search
CPC ...................................................... H04B 1/707
See application file for complete search history.

(56) References Cited

U.S. PATENT DOCUMENTS

| | | | |
|---|---|---|---|
| 3,573,817 A | 4/1971 | Akers |
| 4,977,577 A | 12/1990 | Arthur et al. |
| 5,380,994 A | 1/1995 | Ray |
| 5,479,441 A | 12/1995 | Tymes et al. |
| 5,668,803 A | 9/1997 | Tymes et al. |
| 5,686,888 A | 11/1997 | Welles, II et al. |
| 5,809,060 A * | 9/1998 | Cafarella et al. ............... 375/146 |
| 5,835,377 A | 11/1998 | Bush |
| 5,920,589 A | 7/1999 | Rouquette et al. |
| 5,987,058 A | 11/1999 | Sanderford |
| 5,999,561 A | 12/1999 | Naden et al. |
| 6,216,087 B1 | 4/2001 | Want et al. |
| 6,292,108 B1 | 9/2001 | Straser et al. |
| 6,639,939 B1 | 10/2003 | Naden et al. |
| 6,830,181 B1 | 12/2004 | Bennett |
| 6,847,892 B2 | 1/2005 | Zhou et al. |
| 6,851,611 B1 | 2/2005 | Shaw-Sinclair |
| 6,868,111 B1 * | 3/2005 | Oleynik ........................ 375/145 |
| 6,965,314 B2 | 11/2005 | Bohinc, Jr. |

(Continued)

FOREIGN PATENT DOCUMENTS

WO    WO 2011038018    3/2011

OTHER PUBLICATIONS

"Globalstar MMT Wireless Tracker", www.globalstar.com, 2010, 1 page.

(Continued)

*Primary Examiner* — Sam K Ahn
*Assistant Examiner* — Fabricio R Murillo Garcia (57) ABSTRACT

A direct sequence spread spectrum data transmitter for creating a modulated data signal comprising: a programmable-system-on-a-chip baseband modulator having only four blocks of programming logic, the four blocks of programming logic consisting of a DigBuf clock buffer block, a pseudo-random-sequence 8-bit block, an 8-bit timer block, and a serial peripheral interface slave block. A remote telemetry unit comprising the foregoing transmitter. A method for manufacturing the foregoing transmitter. A method for controlling the foregoing transmitter.

27 Claims, 6 Drawing Sheets

Simplified PSOC1 DSSS Baseband Modulator

(56) References Cited

U.S. PATENT DOCUMENTS

| | | |
|---|---|---|
| 6,974,078 B1 | 12/2005 | Simon |
| 7,009,530 B2 | 3/2006 | Zigdon et al. |
| 7,072,320 B2 | 7/2006 | Filho |
| 7,098,784 B2 | 8/2006 | Easley et al. |
| 7,099,770 B2 | 8/2006 | Naden et al. |
| 7,187,278 B2 | 3/2007 | Biffar |
| 7,190,265 B1 | 3/2007 | Bohinc, Jr. |
| 7,262,685 B2 | 8/2007 | Bastian, II |
| 7,315,281 B2 | 1/2008 | Dejanovic et al. |
| 7,327,262 B2 | 2/2008 | Motteram et al. |
| 7,337,061 B2 | 2/2008 | Naden et al. |
| 5,479,441 C1 | 6/2008 | Tymes et al. |
| 7,384,380 B2 | 6/2008 | Reinbold et al. |
| 7,405,655 B2 | 7/2008 | Ng et al. |
| 7,477,694 B2 | 1/2009 | Sanderford, Jr. et al. |
| 7,558,312 B2 | 7/2009 | Cheng et al. |
| 7,593,456 B2 | 9/2009 | Sailaja et al. |
| 7,620,098 B2 | 11/2009 | Hong et al. |
| 7,623,029 B2 | 11/2009 | Meyers |
| 7,672,781 B2 | 3/2010 | Churchill et al. |
| 7,693,530 B1 | 4/2010 | McKinney et al. |
| 7,705,777 B2 | 4/2010 | Sanderford, Jr. et al. |
| 7,895,131 B2 | 2/2011 | Kraft |
| 7,928,844 B2 | 4/2011 | Mackenzie et al. |
| 7,932,827 B2 | 4/2011 | Chand et al. |
| 7,978,065 B2 | 7/2011 | Schnitz et al. |
| 7,994,917 B2 | 8/2011 | Hirota et al. |
| 8,004,397 B2 | 8/2011 | Forrest et al. |
| 8,014,439 B2 | 9/2011 | Sakamoto et al. |
| 8,126,680 B2 | 2/2012 | Troxler et al. |
| 8,159,329 B1 | 4/2012 | Killian et al. |
| 8,223,009 B2 | 7/2012 | Anderson et al. |
| 8,237,575 B2 | 8/2012 | MacLean, III et al. |
| 8,239,169 B2 | 8/2012 | Gregory et al. |
| 2002/0158970 A1* | 10/2002 | Takeshi ............. 348/211.3 |
| 2003/0087631 A1 | 5/2003 | Diachina et al. |
| 2003/0149526 A1 | 8/2003 | Zhou et al. |
| 2004/0124977 A1 | 7/2004 | Biffar |
| 2004/0147220 A1 | 7/2004 | Vaddiparty et al. |
| 2004/0157597 A1 | 8/2004 | Comer et al. |
| 2004/0212499 A1 | 10/2004 | Bohine, Jr. |
| 2005/0113107 A1 | 5/2005 | Meunier |
| 2005/0140498 A1 | 6/2005 | Bastian |
| 2005/0171696 A1 | 8/2005 | Naden et al. |
| 2005/0250440 A1 | 11/2005 | Zhou et al. |
| 2006/0007006 A1 | 1/2006 | Alioto et al. |
| 2006/0011716 A1 | 1/2006 | Perkowski |
| 2006/0059964 A1 | 3/2006 | Bass et al. |
| 2006/0188010 A1* | 8/2006 | Pritchett et al. ............. 375/219 |
| 2007/0025456 A1* | 2/2007 | McCrady .................. 375/260 |
| 2007/0058706 A1* | 3/2007 | Seo .......................... 375/222 |
| 2007/0222595 A1 | 9/2007 | Motteram et al. |
| 2008/0030330 A1 | 2/2008 | Vock et al. |
| 2008/0042842 A1 | 2/2008 | Ulibarri |
| 2008/0051033 A1 | 2/2008 | Hymes |
| 2008/0186166 A1 | 8/2008 | Zhou et al. |
| 2008/0198905 A1 | 8/2008 | Zhu et al. |
| 2008/0221930 A1 | 9/2008 | Wekell et al. |
| 2008/0266131 A1 | 10/2008 | Richardson et al. |
| 2009/0117880 A1 | 5/2009 | Sipher |
| 2009/0322510 A1 | 12/2009 | Berger et al. |
| 2010/0016022 A1 | 1/2010 | Liu et al. |
| 2010/0038417 A1 | 2/2010 | Blankitny |
| 2010/0137148 A1 | 6/2010 | Kaye et al. |
| 2010/0151955 A1 | 6/2010 | Holden |
| 2010/0171611 A1 | 7/2010 | Gao et al. |
| 2010/0224783 A1 | 9/2010 | Frank |
| 2010/0258618 A1 | 10/2010 | Philbrick et al. |
| 2010/0312833 A1 | 12/2010 | Rimmer et al. |
| 2010/0314456 A1 | 12/2010 | Hartwig et al. |
| 2011/0004444 A1 | 1/2011 | Farrow et al. |
| 2011/0017693 A1 | 1/2011 | Thomas et al. |
| 2011/0018418 A1 | 1/2011 | Yoo |
| 2011/0050424 A1 | 3/2011 | Cova et al. |
| 2011/0066398 A1 | 3/2011 | Troxler et al. |
| 2011/0074629 A1 | 3/2011 | Khan et al. |
| 2011/0079652 A1 | 4/2011 | Bass et al. |
| 2011/0112979 A1 | 5/2011 | Holsen et al. |
| 2011/0155920 A1 | 6/2011 | Hupont et al. |
| 2012/0037697 A1 | 2/2012 | Boone et al. |
| 2012/0084182 A1 | 4/2012 | Bass et al. |
| 2012/0087355 A1 | 4/2012 | Wentink |
| 2013/0002484 A1* | 1/2013 | Katz ..................... 342/357.48 |

OTHER PUBLICATIONS

"SmartOne LP, Satellite-Manged Asset-Ready Tracker", www.globalstar.com, 2011, 2 pages.

"Globalstar SMARTTONE Satellite Managed Asset Ready Tracker", www.globalstar.com, 2010, 1 page.

Office Action dated Oct. 6, 2010 in connection with U.S. Appl. No. 12/288,909.

Office Action dated Feb. 7, 2011 in connection with U.S. Appl. No. 12/288,909.

Office Action dated Jun. 10, 2011 in connection with U.S. Appl. No. 12/288,909.

Office Action dated Sep. 20, 2012 in connection with U.S. Appl. No. 13/479,005.

Office Action dated Oct. 26, 2012 in connection with U.S. Appl. No. 13/443,097.

Office Action dated Mar. 7, 2013 in connection with U.S. Appl. No. 13/479,005.

Office Action dated Apr. 12, 2013 in connection with U.S. Appl. No. 13/443,097.

Office Action dated Sep. 6, 2013 in connection wtih U.S. Appl. No. 13/443,118.

Office Action dated Sep. 20, 2013 in connection with U.S. Appl. No. 13/443,819.

Office Action dated Oct. 11, 2013 in connection with U.S. Appl. No. 13/443,841.

Office Action dated Nov. 20, 2013 in connection with U.S. Appl. No. 13/443,097.

Office Action dated Jan. 30, 2014 in connection with U.S. Appl. No. 13/443,819.

Office Action dated Mar. 26, 2014 in connection with U.S. Appl. No. 13/443,118.

Office Action dated Apr. 24, 2014 in connection with U.S. Appl. No. 13/443,097.

Office Action dated May 22, 2014 in connection with U.S. Appl. No. 13/443,841.

Office Action dated May 28, 2014 in connection with U.S. Appl. No. 13/443,819.

Office Action dated Jul. 18, 2014 in connection with U.S. Appl. No. 13/443,118; 17 pp.

Office Action dated Aug. 5, 2014 in connection with U.S. Appl. No. 13/443,097; 18 pp.

* cited by examiner

Figure 1 (Prior Art)
Typical DSSS Transmitter Implementation

Figure 2 (Prior Art)
PSOC1 DSSS Baseband Modulator Implementation per AN2165

Figure 3
Simplified PSOC1 DSSS Baseband Modulator

Figure 4
Software Control

Figure 5
DSSS Transmitter Implementation

Figure 6
RTU Implementation

SYSTEM AND METHOD FOR IMPLEMENTATION OF A DIRECT SEQUENCE SPREAD SPECTRUM TRANSMITTER

BACKGROUND OF THE INVENTION

1. Field of the Invention

The present invention relates generally to the field of wireless telemetry and, more specifically, to a system and method for simplifying the creation of a direct sequence spread spectrum (DSSS) radio transmitter. The invention taught herein greatly simplifies the required hardware and software typically utilized in creating the DSSS spreading and data waveforms and enables the creation of fundamentally miniature radio transmitters for use in embedded telemetry systems and the like. This reduction in complexity and size enables extremely small, battery-operated telemetry solutions such as are being deployed in location-based services devices.

2. Description of the Related Art

Direct sequence spread spectrum radio transmission is a method utilized in the art for communicating wireless voice and data. Advantages of using DSSS as the radio modulation means include security, fade resistance, low probability of intercept, and multiple use of channel spectrum. This modulation means was first conceived in 1941 by Hollywood actress. Hedy Lamarr and pianist George Anthiel, who obtained U.S. Pat. No. 2,292,387 entitled "Secret Communication System." DSSS use was largely constrained to secure voice and data communication systems until the late 1980s, when the Federal Communications Commission allocated several frequency spectrum bands for unlicensed, multi-user purposes. DSSS was a logical choice for radio modulation due to the ability for multiple users to simultaneously use the spectrum and the associated receiver to differentiate the desired transmitter. Commercial utilization of DSSS modulation became widespread, with DSSS techniques utilized in terrestrial WiFi links, wireless alarm systems such as described in U.S. Pat. Nos. 4,977,577 and 5,987,058 entitled "Wireless Alarm System" to Sanderford et al., commercial satellite television systems such as Direct TV, and commercial satellite communication systems such as the Globalstar Simplex Data Service. These systems all share the common modulation method whereby the data is mixed with a broadband random or pseudo-random signal, thereby creating a broadband modulated data signal to be radio-transmitted. The system receiver recovers the data by mixing the broadband transmitted signal with the identical and in-phase randomization signal. The art of creating and receiving. DSSS signals is well known.

DSSS as a modulation data method is inherently more complicated than analog systems such as amplitude modulation (AM) or frequency modulation (FM). Creation and mixing of the broadband randomization signal requires hardware and software methods and means that are not required for simpler modulation methods. Implementing the system components of transmitters and receivers requires a level of complexity that has been the focus of technology development since DSSS inception. Designers have two options—develop custom application-specific integrated circuits (ASIC) or use commercially available hardware and software systems to construct the DSSS components. ASIC development is costly but can result in fundamentally miniaturized hardware solutions. A strong business case is typically required to make the investment for custom circuitry such as ASICs. WiFi is an example of a DSSS system that has passed the consumer volume thresholds that enable ASIC development. On the other extreme are low-volume terrestrial point-to-point data links that are generally specific to an application. Designers wishing to develop DSSS links for lower-volume applications often use off-the-shelf commercial components for cost reasons, but these off-the-shelf components increase the overall size of the device.

Designers continue to scour commercial product offerings to find new and better ways to construct system components. In particular, the expanding communications capabilities in hand-held telephones fuels new chipsets that can be used to develop spin-off communication systems. The present invention utilizes a combination of components that were developed for different applications and that, when combined as taught herein, significantly narrow the gap between full ASIC and commercial off-the-shelf DSSS transmitter capability. The present invention utilizes two commercially available chips to create a DSSS transmitter functionality that overcomes existing barriers in size, power (energy) requirements, and cost.

The first chip used in the present invention is a microprocessor component that incorporates a programmable logic capability, which provides the ability to create software-plus-hardware functionality in a single chip. The manufacturer of this chip calls it a programmable system on a chip (PSoC), and it is commercially offered in a large variety of configurations. The first generation of the PSoC family is called PSoC1 and was fueled in production volume by sales of the Apple iPod. The PSoC family of mixed signal arrays is manufactured by Cypress Semiconductor Corporation ("Cypress") of San Jose, Calif. and has grown to include two subsequent PSoC families.

The second chip is a radio frequency (RF) I/Q modulator. The I/Q modulator is one of several chips being driven in volume by cellular telephone demand. It merges together frequency synthesis and data modulation and, in some cases, amplification into one chip. Two examples of such a chip are the ADRF6702 manufactured by Analog Devices, Inc. of Wilmington, Mass., and the RFMD2081 manufactured by RF Micro Devices, Inc. of New Delhi, India. The term "I/Q" is a term used in the telecommunications industry to refer to the in-phase ("I") and quadrature ("Q").

The present invention is a system and method for incorporating a DSSS modulation capability in the smallest of the PSoC1 devices, utilizing the least capable programmable logic functionality offered by the manufacturer. In a preferred embodiment, the present invention performs this function in a commercial component that measures 3×3 mm, in a 16 pin PSoC1 part, available at a cost of approximately $1 USD. Present state-of-the-art for developing a DSSS baseband modulator is provided by Cypress in the application note AN2165. In contrast to what is taught in the application note, the present invention performs this functionality utilizing only half of the required PSoC resources. The reduction in required PSoC resources represents the fundamental innovation of the present invention and results in DSSS transmitter development that achieves embedded circuit layout space under 0.75"×0.5" and, in one embodiment, a mere 0.5"×0.5" square footprint.

The present invention is directly applicable to satellite communication systems and specifically suited for use in the Globalstar Simplex Data Service. The latter service utilizes one-way, transmit-only terrestrial devices that incorporate a DSSS transmitter to collect data globally through DSSS receive-only gateway earth stations. Current state-of-the-art Globalstar DSSS transmitters utilizing commercial off-the-shelf components are nine to 12 times larger. The present invention teaches how to utilize the resources of the PSoC1 mixed signal array coupled with now available I/Q modulators to achieve an overall size reduction that enables battery-operable mobile devices to operate in smaller and more power-efficient applications that could never before be served. For example, the present invention can radio-enable a remote battery-powered sensor that is roughly the size of a single AA battery, compared to the existing sensor devices that typically are 3"×6" in size or larger.

This reduction in size enables the sensor monitoring and asset tracking of package-sized assets versus the larger devices, which are limited in application to tracking larger assets, such as the trucking and railcar-tracking solutions offered today. For example, size reduction of RFID chips has enabled use of the devices in animal identification as well as small package tracking. Similarly, reduction of size in satellite tracking tags will open markets for small parcel tracking and tracking of small animals such as birds and marine wildlife.

Accordingly, it is an object of the present invention to provide a method for implementing a DSSS baseband modulator in a PSoC1 mixed signal processor suitable as a component of a DSSS transmitter. It is a further object of the present invention to provide a method for constructing the DSSS transmitter utilizing the PSoC1 and an I/Q modulator.

BRIEF SUMMARY OF THE INVENTION

The present invention is a direct sequence spread spectrum data transmitter for creating a modulated data signal comprising: a programmable-system-on-a-chip baseband modulator having only four blocks of programming logic, the four blocks of programming logic consisting of a DigBuf clock buffer block, a pseudo-random-sequence 8-bit block, an 8-bit timer block, and a serial peripheral interface slave block. In a preferred embodiment, the invention further comprises an I/Q modulator.

In a preferred embodiment, the invention further comprises radio frequency translation and a radio frequency amplifier. Preferably, the modulator uses a packet start/stop framing signal from the programmable-system-on-a-chip baseband modulator to enable and disable the radio frequency amplifier.

In a preferred embodiment, the invention further comprises a clock reference. In yet another preferred embodiment, the invention further comprises a low-pass filter.

In a preferred embodiment, the invention further comprises a radio frequency connector for attachment of the transmitter to an external antenna. In yet another preferred embodiment, the invention further comprises an embedded antenna.

In a preferred embodiment, the physical footprint size of the transmitter is less than or equal to 0.75 inches by 0.5 inches. Preferably, the transmitter is configured to operate over the Globalstar Simplex Satellite Network. In an alternate embodiment, the transmitter is configured to operate over a terrestrial data link.

The invention is also a remote telemetry unit comprising the direct sequence spread spectrum transmitter described above. In a preferred embodiment, the remote telemetry unit further comprises an antenna and power management means. Preferably, the remote telemetry unit has a location, and the invention further comprises means for determining the location of the remote telemetry unit.

In a preferred embodiment, the invention further comprises a short-range transceiver that enables the remote telemetry unit to communicate locally with external system components. Preferably, the short-range transceiver is BLUETOOTH® low energy. The invention preferably further comprises radio frequency identification means for providing localized identification of the remote telemetry unit to an external system.

The invention is also a remote telemetry unit comprising a direct sequence spread spectrum data transmitter for creating a modulated data signal comprising: a programmable-system-on-a-chip baseband modulator having only four blocks of programming logic, the four blocks of programming logic consisting of a DigBuf clock buffer block, a pseudo-random-sequence 8-bit block, an 8-bit timer block, and a serial peripheral interface slave block; an I/Q modulator; radio frequency translation; and a radio frequency amplifier.

The invention preferably further comprises a short-range transceiver that enables the remote telemetry unit to communicate locally with external system components. Preferably, the short-range transceiver is BLUETOOTH® low energy. The invention preferably further comprises radio frequency identification means for providing localized identification of the remote telemetry unit to an external system.

In a preferred embodiment, the invention further comprises an antenna and power management means. Preferably, the remote telemetry unit has a location, and the invention further comprising means for determining the location of the remote telemetry unit. In one embodiment, the transmitter is configured to operate over the Globalstar Simplex Satellite Network. In an alternate embodiment, the transmitter is configured to operate over a terrestrial data link.

The invention is also a method for manufacturing a direct sequence spread spectrum transmitter comprising: providing a programmable-system-on-a-chip baseband modulator having only four blocks of programming logic, the four blocks of programming logic consisting of a DigBuf clock buffer block, a pseudo-random-sequence 8-bit block, an 8-bit timer block, and a serial peripheral interface slave block; and combining the programmable-system-on-a-chip baseband modulator with an I/Q modulator to form a transmitter.

The invention is also a method for controlling the direct sequence spread spectrum transmitter described above comprising: enabling power to the transmitter; initializing and enabling the programmable-system-on-a-chip baseband modulator; utilizing a reference clock to gate and initiate a direct sequence spread spectrum transmission; during the direct sequence spread spectrum transmission, outputting a data stream to the programmable-system-on-a-chip modulator using the processor; during the direct sequence spread spectrum transmission, enabling frequency translation and power amplification; and upon completion of the direct sequence spread spectrum transmission, disabling the programmable-system-on-a-chip baseband modulator, frequency translation, power amplification and reference clock.

DETAILED DESCRIPTION OF INVENTION

The present invention is a system and method for using a PSoC1 mixed signal array and an I/Q modulator to construct a DSSS transmitter. The preferred embodiment incorporates the smallest of PSoC1 component offerings, utilizing a mere four blocks of programmable logic. The existing PSoC1 family of mixed signal arrays is constructed in two rows of four blocks each so that the implementation of a DSSS baseband modulator utilizing only four blocks represents a significant innovation over prior art. The PSoC1 baseband modulator of the present invention is coupled to a single-chip I/Q modulator to create a functional and miniature two-chip DSSS transmitter. In a preferred embodiment, this miniaturized transmitter is operable over the Globalstar Simplex Data Service, and it also has direct application in terrestrial data service applications such as metering and the like.

The preferred embodiment incorporates a frequency reference, such as a crystal, to time-synchronize the baseband and I/Q modulators. The preferred embodiment also includes an analog filter to enhance the spectral shape of the transmitted signal in order to limit the amount of RF energy transmitted into adjacent frequency bands. In addition, the preferred embodiment uses an RF amplifier to boost the resulting radio signal to appropriate power levels suitable for use over a prescribed radio system.

The utility of the present invention can be readily demonstrated by describing how it operates as part of a remote telemetry unit (RTU) assembly. An RTU may be specific in application and designed to fulfill a single function or a small set of functions. An example of a specific RTU is remote metering, where utility usage information is transmitted over a radio data link. An RTU may also be broad in application and designed to fulfill a general capability that may be applied to a wide variety of uses. An example of a broad RTU is location-based services (LBS), where the RTU performs a simple location determination function and then relays the location data over the radio data link. The operation is generic, but the value is derived by the application end user. Such LBS-based RTUs have found utility in commercial tracking of tractor trailers, containers, ocean vessels and other hard assets.

The present invention enables a new class of RTU due to size reductions made possible through super-integration in the commercially available chipsets and the innovative use of available resources within the chipset, as described more fully below. A substantial reduction in the size of a primary sub-component of an RTU allows a substantial overall size reduction of the RTU itself, which results in radio data communication use opportunities in applications where RTU size is an enabling factor. For example, it is unfeasible to track and locate a small box using a track and locate RTU that is larger than the box itself. The present invention enables the creation of satellite-based tag, track and locate (TTL) RTU devices that are—for the first time ever—essentially the size of the battery and antenna. The utility provided by the present invention is directly applicable, but not limited to, RTU applications supporting: location-based services in general personnel and animal tracking, mobile and fixed asset management, proximity detection, remote sensor data collection, metering, point of sale data collection, industrial process monitoring, eavesdropping, and covert tag track and locate operations.

As noted above, the present invention is specifically designed for (but not limited to) use in the Globalstar Simplex Data Service network. This network is a constellation of low-earth-orbit (LEO) satellites managed by Globalstar, Inc. of Covington, La. Each satellite operates as a radio repeater, collecting and relaying received simplex radio signals from earth to gateway ground stations for data delivery over the Internet. Each gateway ground station contains a DSSS receiver capability that can detect and decode the one-way, simplex data that originated in the distributed application RTUs. The RTU represents any of a wide variety of application devices, each incorporating a DSSS radio transmitter. The present invention is directly usable in any of the existing RTU devices in service and, more importantly, directly usable in new applications that require miniaturization relative to current state-of-the-art RTU devices.

Because the present invention is a fraction of the size of current DSSS transmitters, it enables smaller integrated RTU development, which enables new market opportunities for remote data services. For example, existing RTU devices operating over the Globalstar Simplex Data Service incorporate the DSSS transmitter manufactured by Globalstar with footprint dimensions of 1.28"×2.3" or 11.8 square inches. The present invention can be manufactured with a footprint dimension of 0.5"×0.5" or 0.25 square inches. The resulting reduction in layout footprint enables RTU development reductions, which in turn can enable new market opportunities for monitoring remote devices where smaller size is of value. For example, current RTUs employed in location-based services generally track larger assets such as tractor trailers or containers. The RTU of the present invention, on the other hand, requires only a single AA battery, which renders it suitable for tracking packages, small animals, etc.

One of the primary innovations of the present invention is the organization of internal resources of the PSoC1 mixed signal array processor. The PSoC1 processors manufactured by Cypress have a low-power microprocessor core and a programmable logic array area. The designer may select from a limited pallet of analog and digital functions which may be placed and routed in the programmable logic area. The present invention teaches how to utilize the minimal amount of resources possible on the smallest of the PSoC parts using only a single row of programmable blocks.

Each PSoC1 part is organized in rows of programmable blocks, and each block is able to be configured for a limited set of digital or analog functions. The absolute minimal PSoC1 part that contains any programmable blocks at all is equipped with a single row containing four digital blocks. Examples of such parts used in the preferred embodiment of the present invention are the CY8C21223 and CY8C21434 parts. Other one-row PSoC1 parts exist and are equally applicable and relevant to the present invention. The smallest physical part offered by Cypress is the CY8C21223 part, which offers 16 pin connections in a 3×3 mm square package. This part contains the smallest number of programmable blocks, with a mere 4 kilobytes of programmable ROM storage. As such, it represents the ideal processor for demonstrating the innovation of the present invention.

Figure 1:
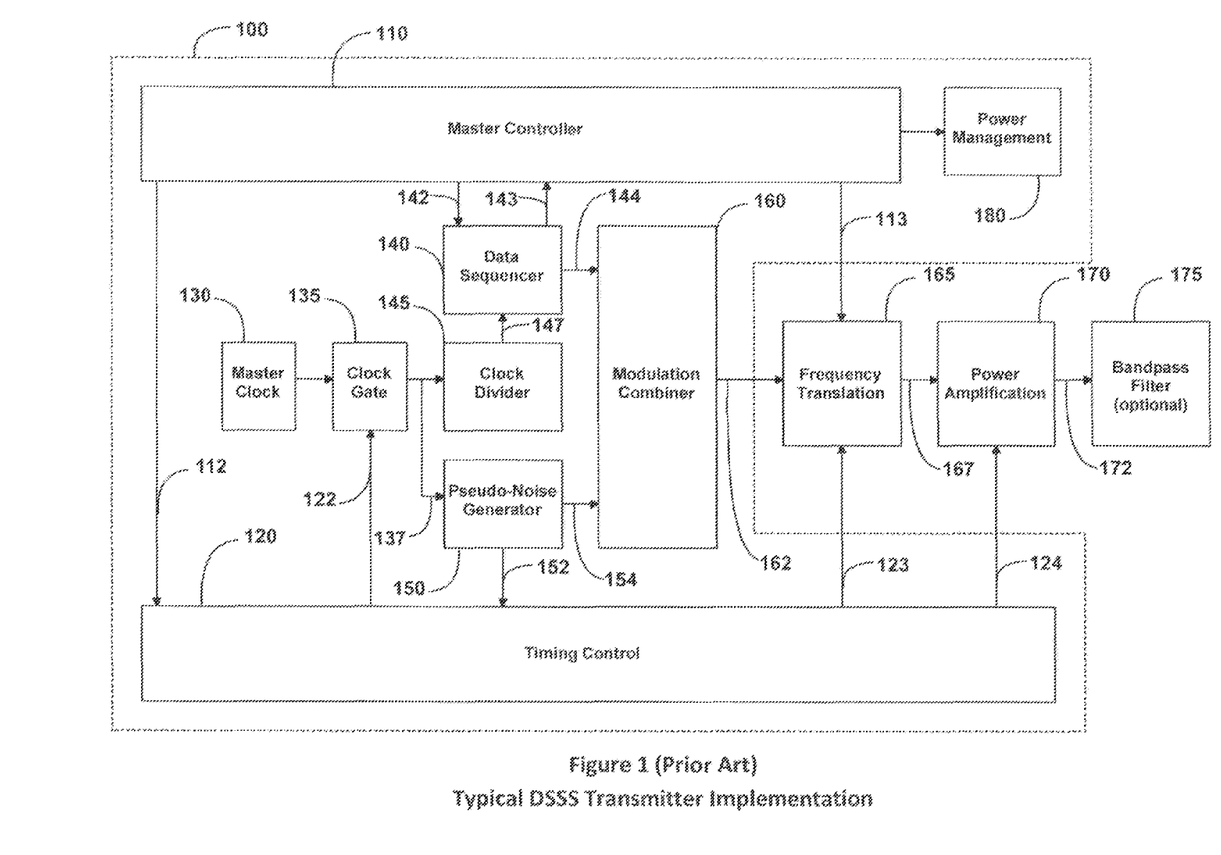
FIG. 1 is an illustration of a typical prior art implementation of a DSSS transmitter.

Implementation of a DSSS transmitter requires several key functions. FIG. 1 is a block diagram of a typical DSSS transmitter implementation. A typical DSSS transmitter will contain a Master Controller 110 that performs the application function of the transmit process. The Master Controller 110 is typically a microprocessor but could also be implemented as a data store or other hardware controller that initiates the transmit process and feeds data to the other blocks. For the purposes of this description, the Master Controller 110 is a microprocessor. The Master Controller 110 initiates and suspends the transmit process via control 112 with a Timing Control 120. The Master Controller 110 also feeds data for transmitting 142 and monitors data completion status 143 with the Data Sequencer 140. The Master Controller 110 also generally manages the power of the overall transmitter operation depicted in the Power Management block 180. As used herein, the term "Power Management" means enabling or disabling devices on the transmitter at the appropriate times to optimize power usage. Because the Master Controller 110 is generally slow or contains timing variability in its interfaces, the actual transmit process is typically relegated to a Timing Control 120. The Timing Control 120 function could be incorporated into the microprocessor as long as the critical control signals for the transmit process are presented at the proper timing. The Timing Control is typically delegated to a hardware state machine, removing the need for critical timing in software.

The Timing Control 120 manages the critical sequence of steps for the transmit process. Once initiated by the Master Controller 110 via the control interface 112, the Timing Control 120 enables the Master Clock 130 via the Clock Gate 135 for the subsequent transmitter components so that all are locked to a coherent clock reference 137. The Pseudo-Noise Generator 150 creates the spreading signal used to modulate the data to create the baseband modulated signal 162. The Pseudo-Noise Generator 150 is typically constructed using a maximal length feedback shift register configuration. The Pseudo-Noise Generator 150 chipping rate is an integer multiple of the data symbol rate, the ratio represented in this diagram by the Clock Divider 145.

The Pseudo-Noise Generator 150 and the Data Sequencer 140 are time locked by the Master Clock 130 and controlled by the Timing Control 120. Data Sequencer 140 produces a data stream in lock-step with the Pseudo-Noise Generator 150 using a clock 147 from the Clock Divider 145. Timing Control 120 monitors the Pseudo-Noise Generator 150 and restarts 152 and initiates or suspends the data process on a data symbol boundary. The Data Sequencer 140 serially delivers data 144 to the Modulation Combiner 160 time coincident with the epoch of the Pseudo-Noise Generator 150. The Data Sequencer 140 is typically created as a shift register that is loaded by the Master Controller 110 via a data interface 142. The Master Controller 110 monitors the Data Sequencer 140 status via 143 and keeps the Data Sequencer 140 full of data until the data message is complete.

The Modulation Combiner 160 logically combines the signal from the Pseudo-Noise Generator 154 with data 144 from the Data Sequencer 140 to create the baseband modulated spread signal 162. For a Binary Phase Shift Key (BPSK) or Fast Frequency Shift Key (FFSK) modulation, the Modulation Combiner 160 performs an exclusive or (XOR) logic function.

The baseband modulated signal is next frequency translated to the desired transmit frequency using a Frequency Translation 165 function. This function is typically a heterodyne upconversion process and generally configured by the Master Controller 110 via some control interface 113. Finally, the modulated signal 167 may be amplified to the desired output power 172 using a means of Power Amplification 170. The Timing Control 120 may also have inputs 123, 124 to the Frequency Translation 165 process and Power Amplification 170 process to effectively key on the signal coincident with data to ensure radiated power only occurs when data is present.

The radiated signal also is typically band limited via a Bandpass Filter 175 function to limit the radiation to the desired frequency band of interest. The Bandpass Filter 175 may be accomplished at several places in the transmit thread, as is known in the art.

The present invention teaches how to accomplish much of the typical DSSS transmitter in the PSoC1 architecture, incorporating the components contained in region 100 to include the Master Controller 110, Timing Control 120, Master Clock 130, Clock Gate 135, Clock Divider 145, Pseudo-Noise Generator 150, Data Sequencer 140, Modulation Combiner 144, Power Management 180 and signals to manage power keying 123 and 124. Specifically, the present invention teaches how to accomplish all of these block functions utilizing the smallest and lowest cost commercially off-the-shelf PSoC1 parts available.

Figure 2:
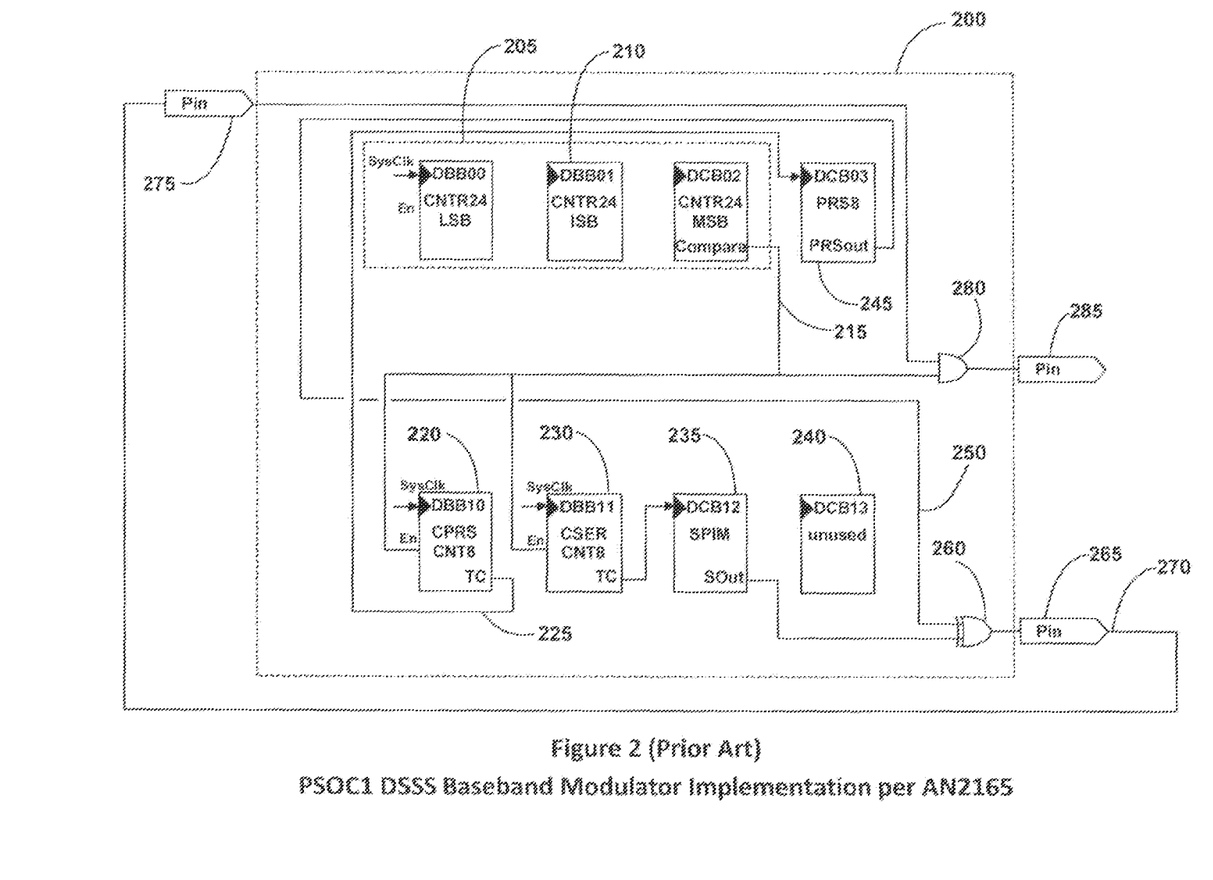
FIG. 2 is an illustration of prior art implementation of a DSSS transmitter utilizing a PSoC1 mixed signal array device.

The Cypress application note mentioned above represents the state of the art for utilization of these parts in DSSS transmitter creation. The application note AN2165 fully describes how to use a PSoC1 part to create a DSSS baseband modulator; however, the note also demonstrates the complexity and exposes the limitations of the component family for use in a DSSS baseband modulator. FIG. 2 is a summary depiction of application note AN2165.

Element 200 represents the physical boundary of the PSoC component. For this example, Cypress proposes the use of three physical pins on the component (elements 265, 275 and 285). The implementation requires a two-row PSoC1 device, each row containing four programmable blocks. FIG. 2 diagrams the programmable configuration as two rows of four blocks, as shown in the AN2165 application note. The creation of the baseband modulated DSSS signal requires several required elements: a serial data stream, a randomization data stream, a mixing (modulation) means, and a timing signal to synchronize the start and stop of the modulated data stream. The PSoC1 part includes the programmable hardware region depicted, with varying amounts of program memory and programmable logic area designated by the specific PSoC part number.

For the example described in the AN2165 application note, the important limitation is the programmable logic array having at least two rows of four blocks. Although the PSoC1 programmable logic area is powerful, it is also fairly limited. There are dedicated routing resources that are used to interconnect the blocks to each other and to the component pins. Not all functions may be positioned for all blocks, and the list of functions is specific and limited. To use the PSoC1 family of parts, the designer selects specific functions and places those functions in specific blocks. The designer must also determine whether there are sufficient routine resources to connect the functions to adjacent blocks and/or pins. The AN2165 application note teaches designers how to best perform this function selection, placement and routing to achieve a DSSS baseband modulator functionality.

Each block in the PSoC1 programmable logic area is essentially an eight-bit register with combinatorial logic. As such, each block can perform functions that are centered on an eight-bit data operation. Library functions that may be selected by the designer include counters, timers, parallel and serial interfaces. These functions are inherently eight-bit data widths. The designer may cascade several eight-bit blocks to create higher order functions, but the placement of the individual blocks must be adjacent. In FIG. 2, three eight-bit counter blocks 210 are cascaded together to form a 24-bit digital counter 205. The output of this 24-bit counter 215 is a signal that frames in time the modulated data signal being transmitted.

This signal performs two important functions: (1) it enables two slave counters 220 and 230; and (2) it enables the output signal (via the AND function 280) sent to the pin of the device 285. The 24-bit counter 205 is used to count the number of reference clocks that coincide with the overall data packet length to be sent; therefore, counter 205 must be preloaded under software control with a 24-bit terminate count value that coincides with the packet length being sent. The preload value must be the product of the data bits and the pseudo-random-sequence (PRS) length and the number two. For example, if the PRS length is 255 chips and the data packet length is 72 bits, the 24-bit counter must be preloaded with count value of 72*255*2 or 32,720. Because the 24-bit counter is limited to a total count of 16,777,215, the largest data packet size supported by the hardware configuration is 32,896 bits assuming a PRS sequence of 255 chips. As discussed in connection with FIG. 3 below, the present invention does not share this limitation.

Each of the programmable blocks in the PSoC1 must be selected from a limited set of library functions supported by the manufacturer. In order to sequence out a serial bit-stream of data, the designer must select a parallel-to-serial type block from the available library components. The choices are limited to universal asynchronous receiver/transmitter (UARTs) or other serial protocol functions that are provided to enable the designer to interface to external components using industry standard protocols. One such industry standard serial interface is Serial Protocol Interface (SPI). This interface is widely supported to enable a master device to send and receive data from a single or multiple devices sharing the same serial bus. SPI protocol requires a master function that manages the traffic on the bus. All peripheral components that share the bus are denoted as slaves and are managed by the master handshake signals to enable operation.

The AN2165 application note uses a master SPI functional block to perform a parallel-to-serial conversion to create the data stream for DSSS transmission. Even though in this example there are no slave devices, the application note describes how to use the function as a parallel-to-serial conversion block. It would typically be better to simply use a shift register component, but the limitation of library options does not provide for this simple function. For this reason, the designer of the system described in the application note transformed the Serial Peripheral Interface Master (SPIM) block 235 into a simple shift register. Data to be transmitted is loaded under interrupt by the software in byte-parallel writes. The databits are serially shifted out of the SPIM block 235 to create the serial data stream to be transmitted. One limitation that must be overcome with the SPIM function as implemented in the PSoC1 library is that it requires two clock pulses for each serial data bit sequenced out. This is a limitation for the library function of the SPIM block provided by the chip manufacturer Cypress. To accommodate this double-clock requirement, the designer must allocate another of the programmable blocks to create a divide-by-two function. Element 230 performs this divide-by-two function relative to the bit rate at the cost of one programmable block resource space.

To create the DSSS baseband signal, a randomization signal must be created. The PSoC manufacturer provides a pseudo-random-sequence (PRS) block in the library of selectable functions. The PRS8 block 245 is a configurable PRS signal generator that supports up to 255 bit chipping sequence (eight-bit). The input and output signals of this block are circuitously routed in the chip due to limited routing resources inside the PSoC1 architecture. FIG. 2 shows the blocks positioned identical to the AN2165 application note so that the circling signal paths represent challenges in routing the signals using available PSoC1 resources. The ratio of clock speeds for the chipping sequence to the data sequence is provided by a second slave counter 220. Both slave counters 220 and 230 are enabled by the 24-bit packet counter 205. When enabled, the eight-bit counter 220 will provide a clock signal 225 that sequences the PRS block to generate the PRS signal 250. Depending on the PRS length and data rate, these two counters provide the synchronized timing of data via the SPIM block 235 and the PRS block 245 to create the DSSS baseband signal.

Referring still to FIG. 2, the only thing required to complete the baseband modulated signal is a modulation means. For DSSS phase modulated signals, such as BPSK, this can be performed using a simple XOR logic function 260. The PRS 245 output is circuitously routed from row one of the PSoC1 part to row two, where it can be XOR combined 260 with the serial data output of the SPIM block 235.

In this example, the combined signal is applied to an output pin of the PSoC1 device 265 but only for the purposes of externally routing the signal 270 back to an input pin 275. This is required due to the lack of internal routing resources to allow the signal from row two of the PSoC1 device back to row one. This external routing requirement is undesirable for radio devices for at least two reasons. First, this signal is the fully modulated baseband signal containing the spectral components of the highest frequency signal in the system, namely, the PRS signal. This signal must be routed in copper on the board and thus may unintentionally radiate, causing undesired radio interference to the system, and may even break spectral limits for regulatory certification. It is much more desirable to keep all high-speed signals inside the chip until the final output signal can be created to limit the designer's challenges to routing one signal.

Second, the external routing requires the use of two pins on the processor. High-volume, cost-sensitive product applications count pins and board space very carefully. The requirement to allocate two pins of the processor for an external loop-back is wasteful and expensive and in some cases may require larger component size to accommodate the additional pins. Nevertheless, this is a requirement due to the limited routing resources of the PSoC1 chip, and the loopback is necessary to implement the DSSS operation as described in the application note.

The looped back signal is re-inserted into the chip via pin 275, where it is AND combined 280 with the 24-bit counter output to time-gate the DSSS signal for final delivery to pin 285. The signal at 285 is framed to ensure the PRS signal and data signals are only enabled for the duration of the packet. Software must accompany the programmable block operation. The software must initiate all transmissions by seeding the 24-bit counter with a value that coincides with the data payload length. The software must sequentially byte-load the SPIM block with data on an interrupt basis. The hardware blocks perform the high-speed digital sequencing of signals leaving the software to spool data out a byte at a time on an interrupt basis.

The configuration taught in application note AN2165 requires a minimum of seven programmable blocks. The unused block 240 is not required for the implementation of the DSSS signal in the application note. Nevertheless, since the blocks are provided in the PSoC1 family in rows of four blocks, the state of the art requires selection of PSoC1 devices that have a minimum of two rows of blocks. The implementation also requires the external loopback of a signal to overcome internal routing resource restrictions and the use of cascaded counters to create the synchronized clocks necessary to overcome the 2x clocks required by the SPIM library function. The implementation is limited to 32,896 bits (about 4K bytes of data using 255 chip code length PRS) maximum due to the size of the 24-bit counter 205.

Because the implementation requires at least two rows of blocks, the available PSoC1 products currently offered by the manufacturer have a minimum package dimension of 5×5 mm. If the DSSS baseband modulator could be constructed using only one row of four blocks, as in the present invention, the designer could select a smaller 3×3 mm packaged size CY8C21223 part. Even if size were not a concern, the designer may gain a row of available programmable resources if the DSSS function could be constrained to one row of four blocks.

Figure 3:
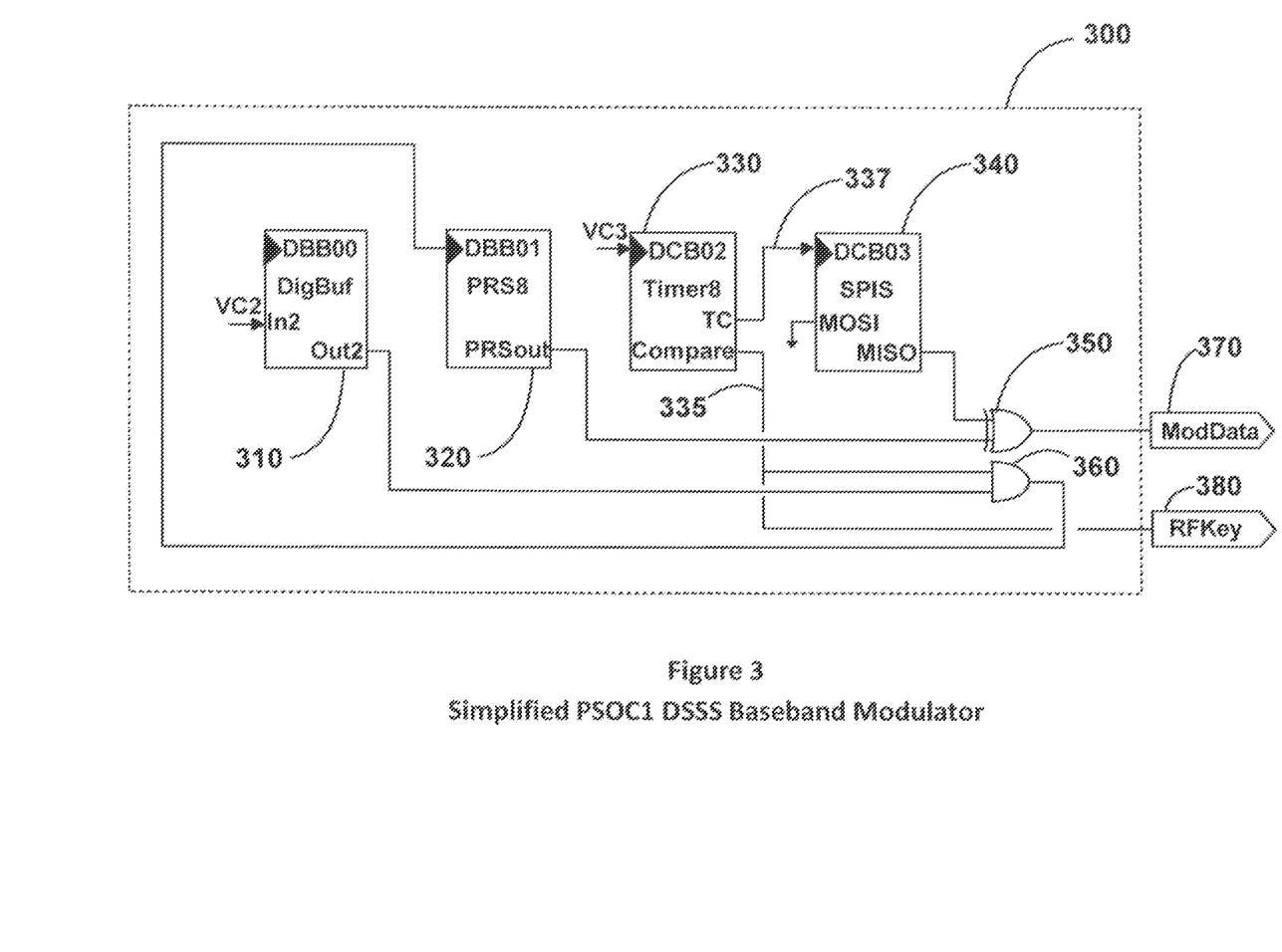
FIG. 3 is an illustration of the simplified PSOC1 DSSS baseband modulator of the present invention.

The present invention overcomes the limitations of the AN2165 design by providing a DSSS baseband modulator functionality in a PSoC1 device using only one row of four blocks. FIG. 3 depicts the programmable resources required to create DSSS baseband modulated signals suitable for use as a component of a DSSS radio transmitter. The present invention is designed to be compatible as a DSSS transmitter functioning in the Globalstar Simplex Data Service system; however, the techniques are equally suitable for any number of satellite or terrestrial communication systems, including, but not limited to, metering, sensor data collection, point-of-sale information, alarms, animal monitoring, location-based services, vibration and other industrial data or proximity notification systems.

FIG. 3 illustrates the system and method of the present invention, specifically, the use of only one row of four blocks in a PSoC1 component to create the entire DSSS baseband modulated signal that required two rows per application note AN2165. The present invention also utilizes the multiplicity of system clock resources of the PSoC1 family. The PSoC1 part creates a system clock from which all the chip functions operate. The system clock (SYSCLK) term is also available to each block in the programmable logic area. Application note AN2165 selected this SYSCLK clock input for all of the blocks in the design shown in FIG. 2; however, the present invention selects several of the derived clock signals available to the designer. PSoC1 architecture makes available to the designer three configurable derived clocks—VC1, VC2 and VC3—that are scaled-down versions of the SYSCLK. These derived clocks are also available to many of the library functions in the programmable logic area.

The preferred embodiment of the present invention utilizes an external crystal reference to set the SYSCLK to a tightly regulated clock frequency. The use of an external crystal is not required to create the DSSS signal but may be required for a specific communication system implementation depending on the frequency and timing stability requirements of the communication system.

For use in the Globalstar Simplex Data Service, the clock stability mandates use of a temperature controlled crystal oscillator (TCXO) with a chipping rate of 1.25 Mchips/second. This is the clock rate required of the PRS element to sequence out the PRS signal. As such the present invention uses a 20 MHz TCXO as an input signal during DSSS transmissions. This sets the SYSCLK to 20 MHz. VC1 prescalar is software configured for a divide by 8; thus, VC1 is 2.5 MHz or twice the required chipping rate. VC2 prescalar is software configured for a divide by 2 using VC1 as source; thus, VC2 is 1.25 MHz. VC3 prescalar is software configured for a divide by 255 using VC2 as source; thus, VC3 toggles every 255 clock pulses of VC2. The programmable clock scalars available to the PSoC1 designer enable the synchronized clock pulses to align data and PRS sequencing.

The AN2165 designer could not use this feature for two reasons: (1) the synchronization counters 220 and 230 were cascaded from the 24-bit data counter 205; and (2) the selection of the SPIM library function to perform the parallel to serial data sequencer requires double clocking, making it impossible to use odd number scalar values for the VC2 and VC3 system clock references. The present invention uses these counter features derived from SYSCLK. The resulting available clock sources yield a chipping rate clock VC2 and a data rate clock VC3 assuming a PRS length of 255 chips. Other chipping rate lengths may be selected by changing the prescalar to VC3. The limitation is that the PRS length must be 255 chips or less with a modulo $2^N-1$ standard PRS generation code length where N is the seed length in bits.

Element 300 represents the PSoC1 component physical chip boundary. Similar to AN2165, the PRS8 function 320 creates the randomization signal for DSSS baseband modulation. In the preferred mode, this PRS length is 255 chips. The PRS block 320 sequences out the PRS signal on the rising edge of the clock input. DigBuf 310 is a waste of a block but required due to routing resource limitations in the PSoC1 chip. DigBuf 310 performs a buffering function to route the VC2 clock to the AND 360 logic function. For continuous streaming implementations of the DSSS signal, block 310 is not necessary, and VC2 can be applied as the clock source to PRS 320. In this implementation, the entire DSSS function can be performed using only three blocks of one row. The preferred embodiment, however, uses a fourth block DigBuf 310 and a logic AND gate 360 to provide precise start and end timing for fixed-length packet telemetry data.

The preferred embodiment, however, uses four blocks of one row (as shown in FIG. 3) to deliver packet telemetry data blocks of 72 bits of data (9 bytes) with precise start and end timing constraints. This is consistent with the network operational requirements of the Globalstar Simplex Data Service. Data packet size, however, is software-driven and may be extended to any length necessary for the system operation.

The Timer8 block 330 performs a similar function to the 24-bit counter 305 in AN2165, but the present invention uses the timer library function versus a counter library function. The difference lies in the routing resources of counters versus timers in the PSoC1 library family. Timers may cascade terminal count outputs to adjacent blocks, whereas counters used in the prior art application note do not. The Timer8 block 330 provides the framing signal that is time-coincident with the transmitted message at the Compare 335 output. This signal performs two functions: (1) it is routed to an output pin 380 as RFKey to provide a signal that may be used to enable an external RF amplifier; and (2) it enables the PRS clock signal via AND function 360. This ensures that the outgoing signal is perfectly framed coincident to the RFKey signal.

The present invention avoids the complexity of the double-clock requirement of the SPIM block 235 by using a SPI slave PSoC library function. The Serial Peripheral Interface Slave (SPIS) function is typically used to emulate a slave component on a shared SPI bus. A slave on the SPI bus will source data clocked out of the device by the SPI master, which supplies the clock. As such, the slave SPI function supports single-clock-per-bit operation. The present invention uses this library function to create the parallel-to-serial operation similar to the AN2165 application note block 235; however, it does not require double clocking or the required 3 clock cycle initialization sequence necessary for the SPIM library function. The SPIS block 340 is clocked from the terminal count output of the adjacent Timer8 block 330. Because the Timer8 library function can source the terminal count (TC) signal to adjacent blocks without using row-routing resources, the SPIS device operates as though it were always enabled and being clocked in a standard SPI slave fetch operation.

The DSSS modulation operation is enabled and gated by the Timer8 block 330. The Timer8 block 330 is clocked by the VC3 system clock, which is divided down from VC2 by the chipping length. As a result, Timer8 330 reaches TC at the PRS repeat rate. In the preferred embodiment, and to comply with the Globalstar Simplex Data Service protocol, the data symbol rate is equal to an integer number of PRS code repetitions. Timer8 block 330 toggles the TC signal as a clock for the SPIS block 340 every N cycles of the PRS block. This feature allows for a wide variety of DSSS implementations from two PRS repetitions per symbol up to 254 repetitions per symbol. To achieve one PRS repetition per symbol, the SPIS block 340 can be configured to use the VC3 as the input clock. TC is used to clock out serial data from the SPIS block 340 at the system symbol rate. Software support is required as in the AN2165 example to keep the SPIS parallel-to-serial buffer full with the next byte on an interrupt basis.

Unlike the AN2165 application example, there is no artificial limit to packet link that Was set by the 24-bit counter 205. The Timer8 block 330 is preloaded with a seed count value and a compare value, both of which are 8-bit terms. The seed count value is the starting binary value that the counter reloads on TC. TC is toggled when the timer/counter counts down to a zero. Thus, the TC output frequency is an integer-divided count of the PRS rate. The Compare 335 output signal is toggled when the countdown value of the timer matches the compare value parameter set by the software. The Compare 335 output signal provides the start and stop framing signal for the DSSS data stream and toggles only when a compare match on the countdown is reached.

The present invention uses this comparison feature to create a signal RFKey 380 at the start of the data message that occurs when the Timer8 block 330 is enabled. This RFKey 380 signal remains active until the software configurable comparison value is detected, at which point the RFKey signal becomes inactive, thus framing the ModData 370 data signal. The software configurable comparison value is initialized to a value outside the normal operating range (such as the seed count value+1) during message transmission and reconfigured to the terminal count value inside the operating range only on the last byte of data to be sent. Because the software sends data in byte-sequential form through the SPIS function, the software can count the bytes being sent and knows when the message is near completion. Timing for the end of the RFKey 380 derived by the comparison value match is deterministic since all blocks are clocked by a common SYSCLK reference. There is no artificial restriction of the 24-bit counter in AN2165 that will auto-terminate the signaling pins. Instead, the present invention uses the compare feature of the Timer8 block to send the end-framing event.

Because the Timer8 function counts down from the seed count value and reinitializes to the seed count value on terminal count of zero, the Compare function is never triggered because the count value is restricted in range from zero to the seed count value. When the software detects the last byte is being sent through the SPIS block 340, it re-initializes the comparison value to time the Compare output 335 coincident to the last bit sent. Because all blocks are synchronously clocked, the timing for the compare match is deterministic, and the Compare 335 output signal toggles at the precise time to frame the ModData 370 signal output.

To complete the DSSS baseband modulated output, the PRS block 320 output is XOR-combined 350 with the SPIS 240 data output to create the ModData 370 output. Because the PRS8 block is clock-gated by the AND 360 of the Compare output 335 of Timer8 block 330 and the chipping clock DigBuf 310 output, all data modulation stops at the end of the message block.

Figure 4:
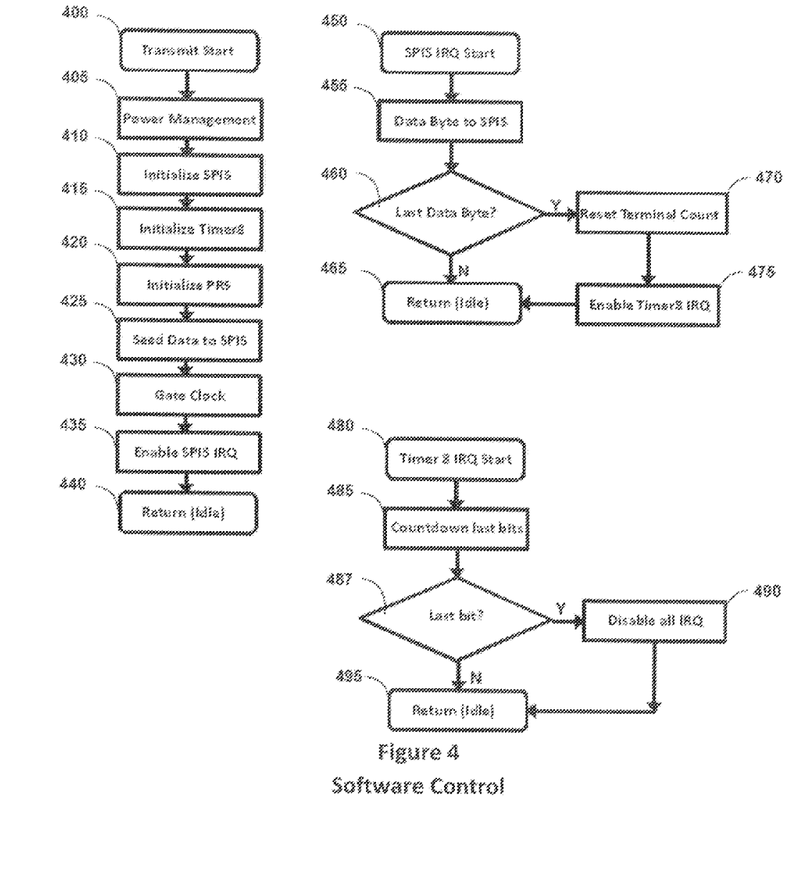
FIG. 4 is an illustration of the DSSS transmitter implementation of the present invention.

The software control that oversees the hardware processes of FIG. 3 for the transmit process is further demonstrated in FIG. 4. Upon initiation of a transmit process 400, the software begins by enabling the necessary hardware power resources for the transmit process 405. The internal PSoC hardware blocks are enabled, bringing them out of dormant low-power mode. These parts include the SPIS block 340, which serves as the Data Sequencer 140 previously discussed and operates as the parallel to serial data register. The software writes a byte into the SPIS block 340 in step 410, which is serially sequenced out during the transmit process. The Timer8 block 330 is enabled in step 415, which counts repetitions of the PRS8 block 320 to create a symbol timing relationship of the pseudo-noise signal to data signal The Timer8 block 320 is initialized with a comparison value that is greater than the PRS per symbol terminal count value. This comparison value function serves to create the RF Key signal 380 that enables amplification coincident with data transmission performing the functions previously discussed as 123 and 124. The Timer8 block 330 counts down from a preset start value to zero. This start value is the number of PRS8 sequence repetitions per data symbol.

Upon reaching zero, the Timer8 block 330 toggles a terminal count (TC) output signal 337 and reinitializes to the Timer8 count and resumes count down. The TC 337 output serves as the Clock Divider 145 function, sequencing out data bits for N repetitions of the PRS8 sequence. Because the Timer8 comparison value was initialized to a number guaranteed to not match during the PRS sequence countdown, the Compare output 335 remains active and is used as the RFKey output 380, 123 and 124. The PRS8 block 320 is enabled and initialized in step 420, which creates the pseudo-noise signal for spreading the data. The processor then initializes the first byte to be transmitted by writing the first data byte into the SPIS block 340 in step 425.

All of the transmit blocks are time-synchronized to the system clock, which is gated in step 430 by enabling the Timer8 330 block. The VC3 system clock is scaled from VC2 by the PRS repetition length. Because the Timer8 block 330 and the PRS8 block 320 are started on the same clock edge upon enablement of the Timer8 operation in step 430, everything is synchronously sequenced and in phase for operation. Data transmission begins and data sequences out of the SPIS block 340. The software then enables the SPIS interrupt 435. The SPIS block 340 creates an interrupt signal to the processor when the data register is ready for a new byte of data. The transmit process is managed by the PSoC1 hardware blocks, which together serve as the Timing Control 120 function. The processor feeds data bytes to the SPIS block 340 on interrupts until the message is complete.

When the SPIS block is empty or can accept another byte of message data, it signals an interrupt, which causes the processor to initiate the interrupt service routine 450. The processor byte serially sends the next byte of data in the continuing message to the SPIS block 340 in step 455. If the byte sent is the last byte of the message 460, the processor writes the comparison value configurable setting for the Timer8 block 330 in step 470 such that the match value output signal is time-coincident with the last bit of data in the last byte being sent. Upon reaching the comparison value, the Timer8 block 330 creates the RFKey signal 380 time coincident with the end of the last bit of data. In order to provide fine tuning of the RFKey signal 380, the Timer8 interrupt is also enabled 475. The TIMER8 interrupt occurs when the Timer8 counter 330 restarts countdown which occurs at the symbol rate. This allows the software to time out the symbols being sequenced out the SPIS block 340 and precisely terminate the RFKey signal 380. The SPIS interrupt routine exits 465, and the processor idles, waiting for the PSoC blocks to complete the message.

The Timer8 interrupt is only enabled while the last byte of data is being sequenced out of the SPIS block 340. The Timer8 interrupt occurs as each bit of the last byte is being transmitted. Each rollover of the Timer8 330 block initiates the interrupt 480, where the processor counts down bits being sequenced 485, looking for the last bit in order to disable the RFKey signal 380 and terminate the transmit process. Once the last bit is sent 487, all interrupts are disabled 490, and the PSoC blocks are disabled as well. The interrupt routine completes 490, and the transmit process suspends.

As discussed previously, the message data length is not limited by the 24-bit counter of the AN2165 design. The message length is completely governed by the processor byte, serially writing data into the SPIS block 340 to create whatever message length is applicable to the system.

The present invention overcomes all of the limitations present in the state-of-the-art PSoC1 baseband DSSS design exemplified by the AN2165 application note. If the DSSS signal is continuous in nature, and the RFKey 380 framing signals are not required for start and stop, the DSSS signal can be provided with as few as two PSoC1 blocks using a PRS8 (320) and SPIS (340) library function and an XOR (350) logic function. Most systems require packet start/stop framing (RFKey) to control external amplification. Even providing the RFKey signal 380 beyond what was provided in the AN2165 application note, the present invention performs the entire DSSS baseband modulated signal generation using only a single row of four programmable PSoC1 blocks. This enables the selection of the smallest physical sized component offered by the manufacturer, and it also minimizes the internal resources, leaving other blocks open for application use.

Note also that the present invention avoids the external loopback of any signals outside of the chip, thereby avoiding the related radiation and board layout issues or wasted pins inherent with the AN2165 configuration. In addition, because the present invention uses the SPIS block instead of the SPIM block, it avoids the complexity of double-clocking the block function, thus enabling the use of other system derived clock resources. The present invention is not limited in terms of packet length. The software manages the terminate operation utilizing the compare match 335 of the Timer8 block 330, whereas the AS2165 example is limited to approximately 4K bytes of data assuming a PRS length of 255.

As noted above, the preferred embodiment of the present invention is specifically designed for use on the Globalstar Simplex Data Service; it provides a BPSK baseband modulated DSSS signal and coincident RFKey outputs. Alternative configurations can easily support different spread spectrum modulated outputs. For example, the FIG. 3 configuration could be duplicated in whole or part on a second row with a set phase delay to provide quadrature phase shift keyed (QPSK) 1 and Q output signals. The output signals could also drive frequency modulated signals to create fast frequency shift keyed (FFSK) spread spectrum signals. Additionally, the XOR function could be replaced with digital-to-analog functions inside the PSoC part to drive analog signals out for amplitude modulated (AM) signals or in dual row configuration to drive quadrature amplitude modulated (QAM) signal implementations. Custom modulation configurations could also be provided whereby some combination of amplitude, frequency or phase modulation (such as M-ary, PSK or FSK systems) could be supported. In summary, the present invention allows for the smallest of PSoC1 resources to be used to create baseband modulated signals that rival complex communication ASICs at extremely low component price points.

The DSSS radio transmitter device can be easily and very cheaply constructed by combining the DSSS baseband modulator realized in the PSoC1 chip with an external I/Q modulator function or other modulation means consistent with the service network. The I/Q modulator function can be incorporated in a single chip, or through a set of components, as the application requires. Recent advances in RF chip manufacturing have enabled single-chip solutions that can create fundamentally miniaturized transmitter devices. The current state-of-the-art RTU operating over the Globalstar Simplex Data Service contains an embedded transmitter with footprint dimensions of 1.28"×2.3", or 11.8 square inches. The present invention can be manufactured with a footprint dimension of 0.5"×0.5" or 0.25 square inches. This can be accomplished by using the smallest PSoC1 device available from the manufacturer at 3×3 mm coupled to one of the commercially available RF I/Q modulator chips, such as the Analog Devices ADRF6702 or the RFMD 2081 device. These chips can be easily interfaced to the PSoC1-created baseband modulator to create the DSSS signal at RF frequencies.

Figure 5:
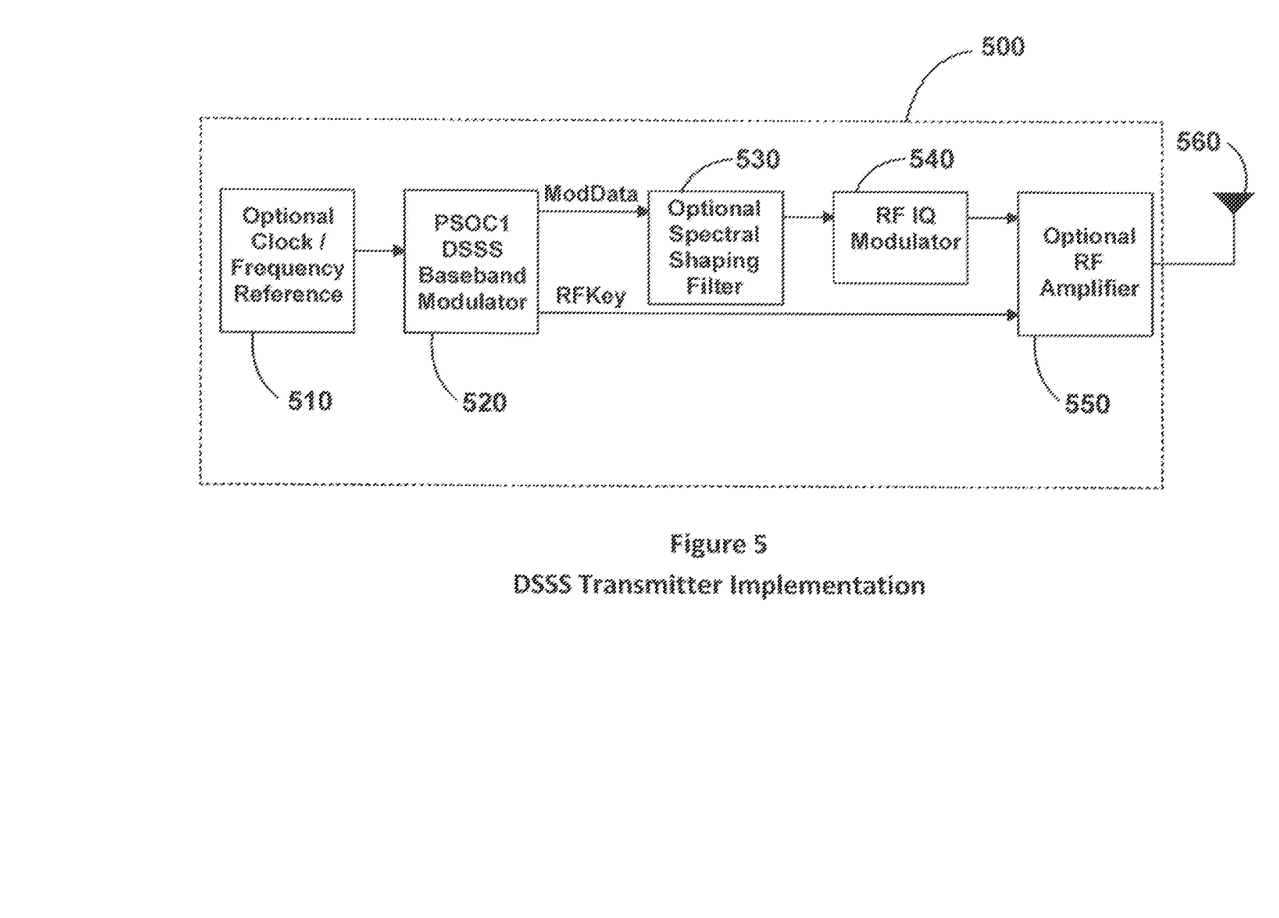
FIG. 5 is an illustration of an RTU implementation utilizing the present invention.

FIG. 5 depicts the DSSS transmitter in the preferred embodiment, which is designed for use over the Globalstar Simplex Data Service but equally usable in a wide variety of point-to-point communication systems. Element 500 depicts the physical boundary of the DSSS radio transmitter. This DSSS transmitter is typically the radio component in an RTU and provides the means to transmit data from the RTU application to the radio network system. Necessary components of the DSSS transmitter include the PSoC1 DSSS Baseband Modulator 520 and the RF I/Q Modulator 540. Optional components include a Clock/Frequency Reference 510, Spectral Shaping Filter 530 and RF Amplification 550. Additionally, the required I/Q Modulator 540 may be simplified into a single axis I or Q modulator for two-phase or two-frequency shift systems. For example, the I/Q Modulator 540 could be replaced by a transformer or other phase-shifting component for BPSK operations where full quadrature modulation is not required. In a preferred embodiment, only the in-phase "I" input of the I/Q Modulator 540 is used with no modulation on the quadrature "Q" input,—creating a BPSK phase modulated system.

The optional components mentioned in the preceding paragraph may become mandatory depending on the radio system requirements. Most radio systems specify the occupied bandwidth accuracies for proper data transmission. The more stringent the channelization and timing requirements, the higher the likelihood that the transmitter must have a tightly managed clock/frequency reference. Element 510 represents a crystal, TCXO or other similar frequency reference from which all the timing and frequency generation functions of the transmitter are derived. This includes the baseband and RF synthesis functions of both the 520 and 540 diagram elements. The preferred embodiment utilizes a 20 MHz TCXO to perform this function, although any suitable reference frequency may be used.

Additionally, the spectral shape of the resulting DSSS signal may require filtering to achieve system or regulatory adjacent channel interference restrictions. The DSSS spectral shape is typically a SINX/X function with the immediate adjacent lobes only attenuated by 13 dB. The adjacent lobe(s) may be reduced in power by applying filtering to the baseband DSSS signal. Filtering at baseband has immediate advantages because it is much easier to create low-pass filters with achievable shape factors at baseband than bandpass filters at RF frequencies. Inserting a low-pass shaping filter at element 530 will translate to a bandpass adjacent channel attenuation at RF frequencies, assuming that all amplification stages post-filter remain linear. Non-linear amplification will result in spectral regrowth and nullify or partially nullify the advantages of the spectral shaping filter 530. This filtering and adjacent channel attenuation process is well documented in the art. It remains optional in the present invention as it is entirely driven by spectral shaping requirements of the network or requirements mandated by spectral regulatory bodies such as the Federal Communications Commission (FCC).

Additionally, the baseband modulated output (ModData) of element 520 may be more than one in the embodiment of a QPSK-generated signal and may require a multiplicity of spectral shaping filters 530. The core concepts remain intact, and the filtering requirements remain dependent on system and regulatory restrictions.

The RF I/Q Modulator element 540 represents the functional block that translates the baseband DSSS signal to the desired radio frequency. The RF I/Q Modulator 540 contains the means to translate the baseband signal to a specific (or selectable) RF channel as mandated by the network of use. The preferred embodiment of the present invention translates the baseband DSSS signal to approximately 1.615 GHz center frequency suitable for use over the Globalstar Simplex Data Service. The exact translation function is unimportant to the present invention as it is directly applicable to any number of target frequencies, such as any of the industrial, scientific and medical (ISM) or licensed bands. The RF I/Q Modulator includes a means for RF translation of the signal and is generally implemented using a RF synthesizer and mixer combination. The RF I/Q Modulator 540 may also contain amplification for the signal as well. The RF I/Q Modulator 540 block, therefore, represents the means for translating the baseband DSSS signal to a desired RF frequency at some power level.

The output power of the RF I/Q Modulator is a function of the implementation and may or may not be suitable for use in a specific network. It is possible to use the output signal directly and radiate the signal to complete a data link. The path loss and sensitivity of the receiving system will dictate whether the output power of the RF I/Q Modulator 540 is sufficient or if additional gain is required.

Optional RF Amplifier 550 performs the additional gain required for a given network system. Element 550 is optional because its requirements are governed by the desired system parameters. The amplifier can be designed in any of the typical methods for RF amplification and in any class. The linearity (class) of the amplifier will dictate the spectral regrowth and may nullify the benefits of the Optional Spectral Shaping Filter 530 if used. Amplification of RF signals is a well-documented process and not critical to the present invention.

The preferred embodiment of the present invention includes all the Optional components of FIG. 5 as mandated by the intended satellite network system. Even with all optional components and also a switching power supply not depicted, the DSSS transmitter 500 can be constructed as a component for RTU integration with a footprint of 0.5"×0.5" or less, significantly reducing the integration size of the RTU from current state of the art 11.8 square inches to 0.25 square inches. The resulting RF signal may be supplied to a radiating element 560 such as an antenna. The antenna 560 may be integrated into the RTU development or remote from the transmitter via an RF conductor such as a coaxial cable or the like.

The DSSS RF transmitter 500 provides the means for relaying a wide variety of data from an RTU to a receiving system. The present invention was primarily developed to relay data from terrestrial RTUs to a space-located satellite system, but the principles disclosed herein are equally applicable to any number of point-to-point communication systems. For example, while the data link may be terrestrial point-to-point, either the transmitter or receiver (or both) may be airborne or located in space, such as a satellite system.

Figure 6:
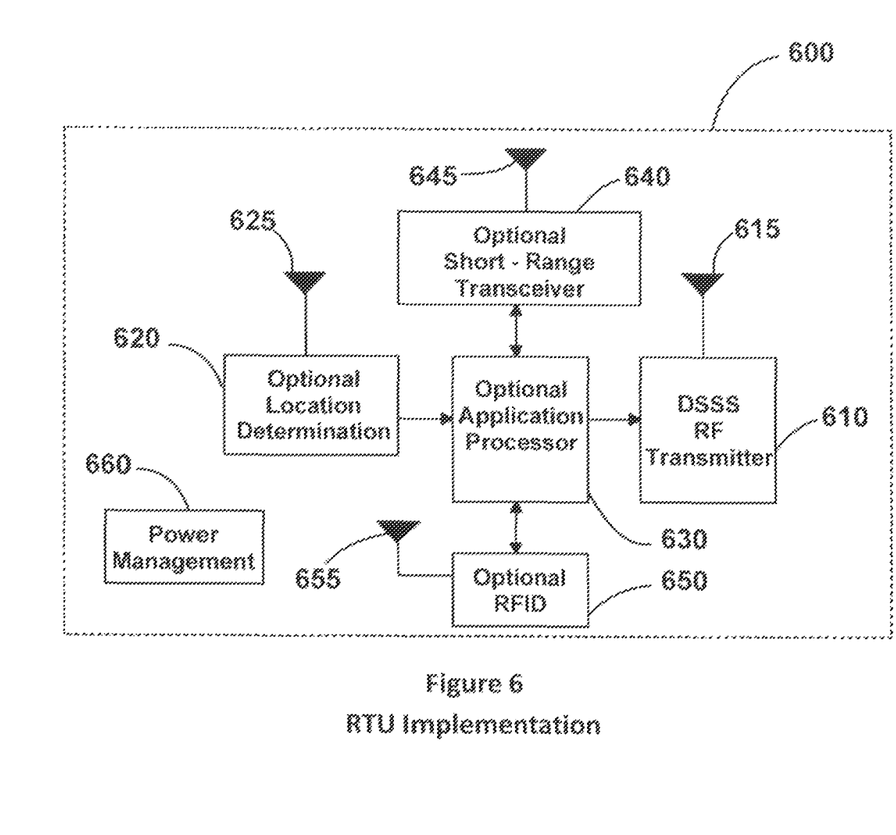
FIG. 6 is a software flowchart demonstrating processor control over the transmit operation of the present invention.

FIG. 6 depicts the wide variety of RTU systems that benefit from the present invention. Most of the elements of FIG. 6 are marked "optional" because the utility they provide are industry- and application-specific. As discussed previously, the RTU may be very specific in nature or broad in purpose, covering a wide range of services and utility for many types of applications. The present invention provides superb utility above present art primarily due to size reduction opportunities for the RTU. End use applications that can benefit from RTU size reduction are enabled by the present invention. FIG. 6 provides a framework for discussing a wide selection of RTU capabilities that are enabled with the DSSS transmitter of the present invention. Element 600 represents the RTU opportunities discussed below.

The smallest embodiment utilizing the present invention requires nothing more than the DSSS transmitter 610, an antenna 615 and a power source such as a battery 660. Such a device can provide a periodic burst transmission, and it can also provide proximity determination means communicating to a remote receiver system the presence of a transmitter within a region of service. Examples of such a device would be man-down service or simple status notification communicating to the receipt system that the RTU is still operating.

The size reduction opportunities of the present invention pair well with similar superscalar reductions of GPS capability. The minimal configuration that provides LBS services would include a location determination means 620 with associated antenna 625 coupled directly to the DSSS RF Transmitter 610 with its associated antenna 615 plus power management 660. The integral processor inside the Location Determination block 620 and/or the DSSS RF Transmitter block 610 would need to support the RTU application task. Location Determination block 620 may be GPS, GLONASS, Galileo GPS, cellular or any other satellite or terrestrial radio communication means to ascertain the RTU location. It may also be possible to ascertain location based on prior knowledge of a starting location and monitor acceleration or other "dead-reckoning" or any combination of the above. The location information can be transmitted over the DSSS RF Transmitter 610 to provide utility in LBS applications.

Optionally, the LBS RTU may incorporate a dedicated Application Processor 630. This may be necessary to overcome any limitations or issues associated with incorporating the RTU application functions into the Location Determination 620 processor or the DSSS RF Transmitter 610 processor.

Another embodiment of the RTU may include a Short-Range Transceiver 640 with associated antenna 645. This Short-Range Transceiver may be a radio device such as BLUETOOTH® low enemy, cellular, proprietary radio link or the like. It may also be an optical or magnetic interface and may not require the antenna 645. The Short-Range Transceiver enables the RTU to communicate locally with external system components. This communication link can support remote sensor configurations or even serve as a primary or secondary backup capability, augmenting the DSSS RF Transmitter 610 capability.

Another embodiment of the RTU may include a Radio Frequency Identification (RFID) capability 650. The RFID system serves as a separate Short-Range Transceiver capability and is generally used to provide localized identification capability of the RTU to an external system. The RFID 650 and associated antenna 655 can be a stand-alone capability of the RTU 600 or integrated into the RTU Application Processor 630.

The RTU integration incorporating the DSSS RF Transceiver provides utility above existing art primarily due to size reductions, although there are performance advantages to super-integration in general. The wide variety of application uses that are enabled by a size reduction alone, are sufficient to open new businesses and industrial opportunities. The present invention achieves this reduction using off-the-shelf commercial components, and the innovative selection of internal resources within those components, at a fraction of the cost and time as compared to ASIC super-integration means.

Many modifications and other embodiments of the invention will come to the mind of one skilled in the art having the benefit of the teachings presented in the foregoing descriptions and the associated drawings. Accordingly, it is understood that the invention is not to be limited to the embodiments disclosed and that other modifications and embodiments are intended to be included within the spirit and scope of the appended claims.

We claim:

1. A direct sequence spread spectrum (DSSS) data transmitter capable of creating a modulated data signal, the transmitter comprising:
a programmable-system-on-a-chip baseband modulator comprising four blocks of programming logic, wherein a first block is configured to receive a first clock signal and generate spreading code, an 8-bit second block is configured to receive a second clock signal and generate a terminal count (TC) bit rate, and a third block is configured to receive the TC bit rate and generate a first data output, the third block comprising a serial peripheral interface slave (SPIS) clocked by the TC, and wherein the 8-bit second block is a timer preloaded with a seed count value and a compare value, the seed count value comprising a starting binary value that counter reloads on the TC, and the TC is configured to be toggled when the timer counts down to zero, the compare value is toggled only when a countdown value of the timer matches a compare value parameter to provide a start and stop frame signal for the DSSS, the first data output is exclusive-or (XOR) combined with the spreading code to generate the modulated data signal; and a fourth block is configured to perform a buffering function to route a second clock signal to be AND combined with the compare value for generating the first clock signal and providing the first clock signal to the first block.

2. The direct sequence spread spectrum data transmitter of claim 1, further comprising an in-phase and quadrature (I/Q) modulator.

3. The direct sequence spread spectrum data transmitter of claim 2, further comprising radio frequency translation and a radio frequency amplifier.

4. The direct sequence spread spectrum data transmitter of claim 3, wherein the I/Q modulator is configured to receive a packet start/stop framing signal from the programmable-system-on-a-chip baseband modulator to enable and disable the radio frequency amplifier.

5. The direct sequence spread spectrum data transmitter of claim 1, further comprising a clock reference configured to provide a clock signal to be used as a basis for at least one of the first clock signal or the second clock signal.

6. The direct sequence spread spectrum data transmitter of claim 1, further comprising a low-pass filter.

7. The direct sequence spread spectrum data transmitter of claim 1, further comprising a radio frequency connector configured to attach the transmitter to an external antenna.

8. The direct sequence spread spectrum data transmitter of claim 1, further comprising an embedded antenna.

9. The direct sequence spread spectrum data transmitter of claim 1, wherein the transmitter is dimensioned to be less than or equal to 0.75 inches by 0.5 inches.

10. The direct sequence spread spectrum data transmitter of claim 1, wherein the transmitter is configured to communicate via a Globalstar Simplex Satellite Network.

11. The direct sequence spread spectrum data transmitter of claim 1, wherein the transmitter is configured to communicate via a terrestrial data link.

12. A remote telemetry unit comprising:
a processor; and
a direct sequence spread spectrum (DSSS) transmitter, the DSSS transmitter comprising:
a baseband modulator comprising:
a spread spectrum circuit configured to receive a first clock signal and generate a pseudo-noise signal for spreading data,
an 8-bit timer circuit preloaded with a seed count value and a compare value, the 8-bit timer circuit configured to receive a second clock signal and generate a terminal count (TC) bit rate, the seed count value comprising a starting binary value that counter reloads on the TC, wherein the TC is configured to be toggled when the timer counts down to zero and the compare value is toggled only when a countdown value of the timer matches a compare value parameter to provide a start and stop frame signal for the DSSS, and
a data sequencer circuit comprising a serial peripheral interface slave (SPIS) configured to receive and be clocked by the TC bit rate and generate a first data output, the first data output is exclusive-or combined with the pseudo-noise signal to generate a modulated data signal, and
a buffer block is configured to perform a buffering function to route a second clock signal to be AND combined with the compare value for generating the first clock signal and providing the first clock signal to the spread spectrum circuit.

13. The remote telemetry unit of claim 12, further comprising an antenna and power source.

14. The remote telemetry unit of claim 12, further comprising location determination circuitry configured to determine a location of the remote telemetry unit.

15. The remote telemetry unit of claim 14, wherein the location determination circuitry comprises one or more of: a global positioning system (GPS) device, a Globalnaya navigatsionnaya sputnikovaya sistema (GLONASS) device, a Galileo GPS, or a cellular telemetry processor configured to determine a location via radio communications.

16. The remote telemetry unit of claim 12, further comprising a short-range transceiver configured to communicate locally with external system components.

17. The remote telemetry unit of claim 16, wherein the short-range transceiver comprises a BLUETOOTH low energy device.

18. The remote telemetry unit of claim 12, further comprising radio frequency identification (RFID) device configured to provide a localized identification of the remote telemetry unit.

19. A remote telemetry unit comprising a direct sequence spread spectrum (DSSS) data transmitter for creating a modulated data signal comprising:
   a programmable-system-on-a-chip baseband modulator comprising four blocks of programming logic, the four blocks of programming logic comprising a DigBuf clock buffer block configured to generate a buffered clock signal, a pseudo-random-sequence 8-bit block preloaded with a seed count value and a compare value, the pseudo-random-sequence 8-bit block configured to receive a first clock signal and generate spreading code, an 8-bit timer block configured to receive a second clock signal and generate a terminal count (TC) bit rate, the seed count value comprising a starting binary value that counter reloads on the TC, wherein the TC is configured to be toggled when the timer counts down to zero and the compare value is toggled only when a countdown value of the timer matches a compare value parameter to provide a start and stop frame signal for the DSSS and a serial peripheral interface slave block configured to receive and be clocked by the TC bit rate and generate a first data output, the first data output is exclusive-or combined with the spreading code to generate the modulated data signal, and wherein the DigBuf clock buffer block is configures to perform a buffering function to route a second clock signal to be AND combined with the compare value for generating the first clock signal and providing the first clock signal to the pseudo-random-sequence 8-bit block;
   a radio frequency (RF) in-phase and quadrature (I/Q) modulator configured to receive the modulated data signal and generate an RF translation of the modulated data signal;
   a radio frequency amplifier configured to receive and amplify the RF translation of the modulated data signal and a RF Key from the programmable-system-on-a-chip baseband modulator and generate an output data signal.

20. The remote telemetry unit of claim 19, further comprising a short-range transceiver configure to communicate locally with external system components.

21. The remote telemetry unit of claim 20, wherein the short-range transceiver comprises a BLUETOOTH low energy device.

22. The remote telemetry unit of claim 19, further comprising radio frequency identification (RFID) device configured to provide a localized identification of the remote telemetry unit.

23. The remote telemetry unit of claim 19, further comprising an antenna and power source.

24. The remote telemetry unit of claim 19, further comprising location determination circuitry configured to determine a location of the remote telemetry unit.

25. The remote telemetry unit of claim 19, wherein the transmitter is configured to utilize a protocol for a Globalstar Simplex Satellite Network.

26. The remote telemetry unit of claim 19, wherein the transmitter is configured to communicate via a terrestrial data link.

27. A method for operating a direct sequence spread spectrum (DSSS) transmitter, the method comprising:
   utilizing, by a baseband modulator, a reference clock to gate and initiate a DSSS transmission by:
   performing, by a buffer block, a buffering function to route a first clock signal to be AND combined with a compare value for generating a second clock signal,
   generating, by a spread spectrum circuit, a spreading code based on the second clock signal,
   generating, by an 8-bit timer circuit preloaded with a seed count value and the compare value, a terminal count (TC) bit rate, the seed count value comprising a starting binary value that counter reloads on the TC, wherein the TC is configured to be toggled when the timer counts down to zero and the compare value is toggled only when a countdown value of the timer matches a compare value parameter to provide a start and stop frame signal for the DSSS;
   generating, by a data sequencer circuit, a first data output as a function of the TC bit rate;
   generating, by the baseband modulator, a modulated data by exclusive-or (XOR) combining the spreading code and the first data output;
   outputting the modulated data as a data stream;
   performing frequency translation and amplifying the data stream; and
   in response to transmitting the DSSS transmission, disabling the baseband modulator, frequency translation, amplification and reference clock.

* * * * *